(12) United States Patent
Shaw et al.

(10) Patent No.: US 10,555,258 B2
(45) Date of Patent: Feb. 4, 2020

(54) USER-CENTRIC ECOSYSTEM FOR HETEROGENEOUS CONNECTED DEVICES

(71) Applicant: AT&T INTELLECTUAL PROPERTY I, L.P., Atlanta, GA (US)

(72) Inventors: Venson Shaw, Kirkland, WA (US); Sangar Dowlatkhah, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 213 days.

(21) Appl. No.: 15/457,521

(22) Filed: Mar. 13, 2017

(65) Prior Publication Data

US 2018/0262578 A1    Sep. 13, 2018

(51) Int. Cl.
*H04W 52/02* (2009.01)
*H04L 29/08* (2006.01)

(52) U.S. Cl.
CPC ......... *H04W 52/0225* (2013.01); *H04L 67/12* (2013.01); *Y02D 70/00* (2018.01); *Y02D 70/1224* (2018.01); *Y02D 70/1242* (2018.01); *Y02D 70/1244* (2018.01); *Y02D 70/1262* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/168* (2018.01); *Y02D 70/23* (2018.01); *Y02D 70/26* (2018.01)

(58) Field of Classification Search
None
See application file for complete search history.

(56) References Cited

U.S. PATENT DOCUMENTS

| | | | |
|---|---|---|---|
| 8,577,392 B1 | 11/2013 | Pai et al. | |
| 8,626,210 B2 | 1/2014 | Hicks, III et al. | |
| 9,444,930 B2 | 9/2016 | Hwang et al. | |
| 9,560,151 B2 | 1/2017 | Lee et al. | |
| 10,117,116 B1 * | 10/2018 | Shaw | H04W 76/10 |
| 2008/0246629 A1 | 10/2008 | Tsui et al. | |
| 2014/0142963 A1 | 5/2014 | Hill et al. | |
| 2014/0188970 A1 | 7/2014 | Madhok et al. | |
| 2014/0347181 A1 | 11/2014 | Donaldson et al. | |

(Continued)

OTHER PUBLICATIONS

Zhang, Yin et al., "Health-CPS: Healthcare Cyber-Physical System Assisted by Cloud and Big Data", IEEE Systems Journal, ResearchGate, Aug. 1-8, 2015.

*Primary Examiner* — Otis L Thompson, Jr.
(74) *Attorney, Agent, or Firm* — Guntin & Gust, PLC; Ralph Trementozzi

(57) ABSTRACT

Aspects of the subject disclosure may include, for example, determining an association between an ecosystem and a user, wherein the ecosystem includes a number of connected devices and a service function accessible via a network. A signal is detected based on a monitoring of a condition by a connected device of the number of connected devices, and responsive to the detecting of the signal a rule is determined. The rule is based on the signal and on the association between the ecosystem and the user. In further response to the detecting of the signal, a connection is facilitated to a service layer of the network and the service function is accessed via the service layer to facilitate delivery of a service based on the rule. Other embodiments are disclosed.

20 Claims, 7 Drawing Sheets

(56) References Cited

U.S. PATENT DOCUMENTS

| | | |
|---|---|---|
| 2014/0351800 A1 | 11/2014 | Jao et al. |
| 2015/0149203 A1 | 5/2015 | Csurka et al. |
| 2015/0245189 A1 | 8/2015 | Nalluri et al. |
| 2015/0324786 A1 | 11/2015 | Desai |
| 2015/0381776 A1* | 12/2015 | Seed ................. H04W 4/70 709/203 |
| 2016/0027280 A1 | 1/2016 | Khan et al. |
| 2016/0041534 A1* | 2/2016 | Gupta ............. G05B 13/0265 700/275 |
| 2016/0073482 A1* | 3/2016 | Fok ................. H04L 12/282 315/294 |
| 2016/0095060 A1* | 3/2016 | Seddighrad ....... H04W 52/0225 370/311 |
| 2016/0217672 A1* | 7/2016 | Yoon ................. A61B 5/024 |
| 2017/0078398 A1* | 3/2017 | Haidar ............. G07C 5/0816 |
| 2017/0235783 A1* | 8/2017 | Chen ................. H04W 4/70 707/691 |
| 2017/0342741 A1* | 11/2017 | Holland ............ H04L 67/125 |
| 2018/0007634 A1* | 1/2018 | Pereira ........... H04W 52/0264 |
| 2018/0208448 A1* | 7/2018 | Zimmerman ....... B67D 1/0888 |
| 2018/0232031 A1* | 8/2018 | Swierk .............. G06F 1/305 |
| 2018/0317266 A1* | 11/2018 | Britt ................ H04L 67/125 |

* cited by examiner

100

300

USER-CENTRIC ECOSYSTEM FOR HETEROGENEOUS CONNECTED DEVICES

FIELD OF THE DISCLOSURE

The subject disclosure relates to a user-centric ecosystem for heterogeneous connected devices.

BACKGROUND

There is an expanding ecosystem of devices people use to access applications and information, or interact with others, and monitor or control processes. This ecosystem goes well beyond desktop, laptop, and tablet computers to encompass the full range of endpoints with which humans might interact. Devices are increasingly connected to back-end systems through various networks, but often operate in isolation from one another. As technology evolves, connection models will likely expand, flow into one another and allow for a greater cooperative interaction between devices. Cooperative interactions between devices can provide applications across business, industry, law enforcement, military, health, and consumer markets.

BRIEF DESCRIPTION OF THE DRAWINGS

Reference will now be made to the accompanying drawings, which are not necessarily drawn to scale, and wherein.

DETAILED DESCRIPTION

Figure 1:
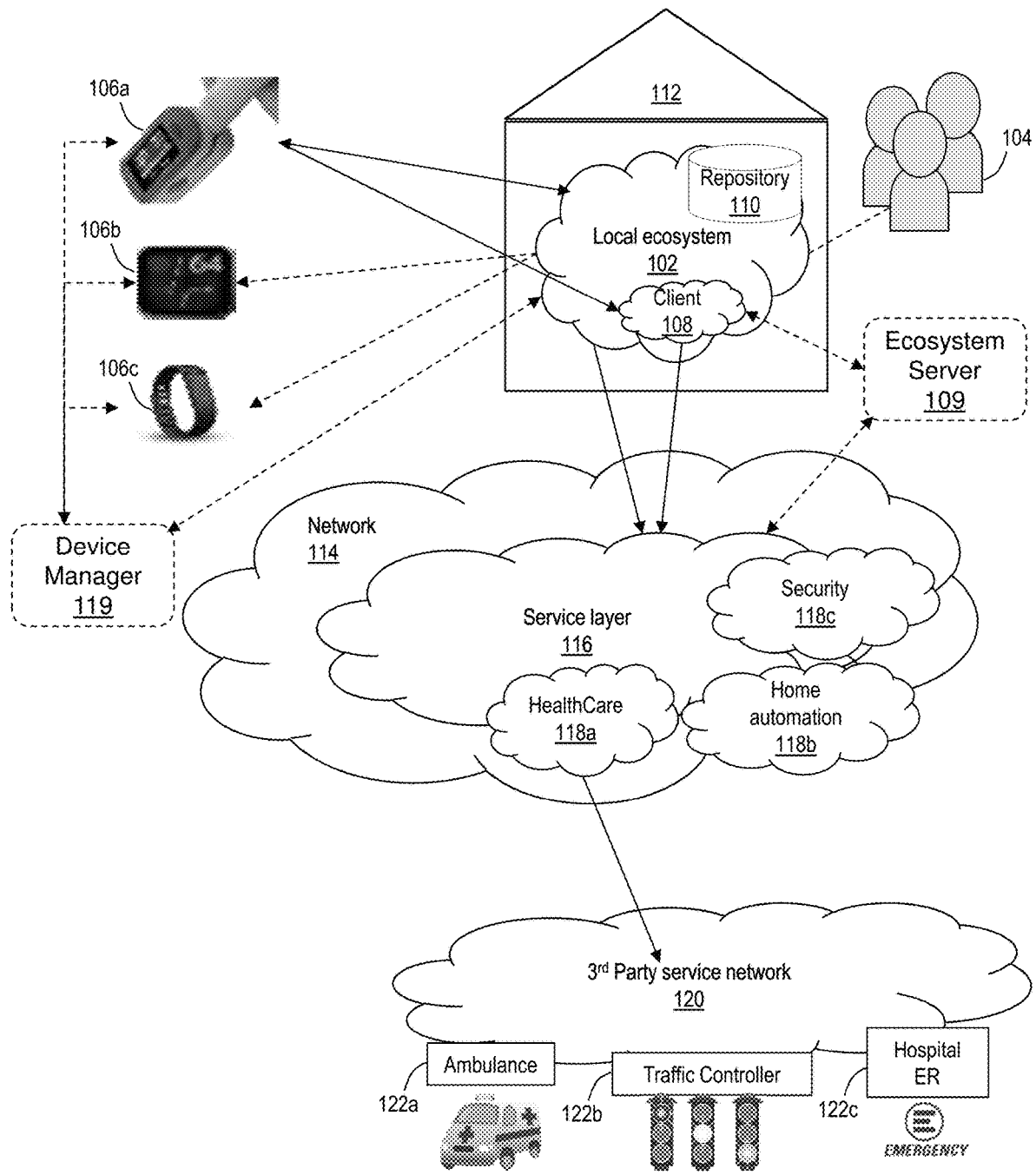
FIG. 1 depicts an illustrative embodiment of an electronic services ecosystem.

The subject disclosure describes, among other things, illustrative embodiments for a user-centric ecosystem. Other embodiments are described in the subject disclosure.

A user-centric local ecosystem provides a mechanism that enables a real-time ecosystem coordinated operation of one or more connected devices and/or services in association with a user and/or group of users. The user-centric local ecosystem can include or otherwise be serviced according to one or more virtual network functions. User-centric ecosystems can include one or more connected devices, one or more digital services, or any combination of connected devices and/or services associated with an individual and/or group of individuals.

In more detail, a user-centric ecosystem includes an arrangement of connected devices that support a delivery of one or more services to a user or group of users. The connected devices can include, without limitation, network accessible devices, such as mobile devices and/or stationary devices that can be accessed by a wired network, a wireless network or both. In general, the connected devices are configured to include a normal operating mode, in which one or more of the connected devices function with little or no interaction with an ecosystem controller. An abnormal condition can be identified based on one or more operational parameters and/or configuration of the connected devices. In response to detection of an abnormal condition, the ecosystem controller queries a repository to determine an associated preference and/or restriction for particular the user or group. The ecosystem controller automatically connects with a service layer to instantiate one more services based on the preference and/or restriction. Accordingly, services can be provided to the user or group automatically and seamlessly in response to detection of an abnormal condition.

One or more aspects of the subject disclosure include a device that includes a processing system having a processor and a memory that stores executable instructions. The instructions, when executed by the processing system, facilitate performance of operations that include identifying an association between an ecosystem and a user, a group of users or both. The ecosystem includes a number of connected devices and at least one service function. The connected devices and the at least one service function are accessible via a service provider network. An alert is received via a wireless mobile network based on a monitoring of an environmental condition by at least one of the connected devices. Responsive to the receiving of the alert, a predetermined rule is identified based on the alert, wherein the predetermined rule is further based on the association between the ecosystem and the user, the group of users, or both. Also in response to the receiving of the alert, a connection if facilitated to a service layer of the service provider network via the wireless mobile network, and the service function is accessed via the service layer. The service function facilitates delivery of a service based on the predetermined rule.

One or more aspects of the subject disclosure include a process that includes determining, by a processing system including a processor, an association between an ecosystem and a user. The ecosystem includes one or more connected devices and at least one service function, wherein the connected device(s) and the service function(s) are accessible via a network. An alert is detected by the processing system based on a monitoring of an environmental condition by at least one of the one or more connected devices. Responsive to the detecting of the alert, a predetermined rule is identified based on the alert, wherein the predetermined rule is further based on the association between the ecosystem and the user. Also responsive to the detecting of the alert, a connection is facilitated to a service layer of the network, and the service function is accessed via the service layer. The service function facilitates delivery of a service based on the predetermined rule.

One or more aspects of the subject disclosure include a machine-readable storage medium, including executable instructions that, when executed by a processing system including a processor, facilitate performance of operations. The operations include determining an association between an ecosystem and a user, wherein the ecosystem includes a number of connected devices and a service function, wherein the plurality of connected devices and the service function are accessible via a network. A signal is detected based on a monitoring of a condition by a connected device of the number of connected devices, and responsive to the detecting of the signal a rule is determined. The rule is based on the signal and on the association between the ecosystem and the user. In further response to the detecting of the signal, a connection is facilitated to a service layer of the network, and the service function is accessed via the service layer, wherein the service function facilitates delivery of a service based on the rule.

FIG. 1 depicts an illustrative embodiment of a communication system 100 including a user-centric ecosystem. According to the illustrative embodiment, a local ecosystem 102 is associated with a user or group of users 104. The local ecosystem 104 includes one or more connected devices 106a, 106b, 106c, generally 106, a client application 108, and a repository 110. One or more of the local ecosystem 102, the connected devices 106, the client 108, and the repository 110 can be located at and/or otherwise associated with a particular location 112, such as a residence, a place of business, a retail outlet, a public venue, such as a public building, a park, an arena and the like. Alternatively or in addition, the particular location 112 can include a vehicle, such as a cruise ship, a train, an automobile, an airplane, and the like.

One or more networks 114 provide network connectivity between at least some of the various components and devices of the communication system. The network 114 can include a service provider network, such as a cable provider, satellite service provider, and the like. The network 114 can include a public network, a private network, e.g., a private LAN, an enterprise network, and combinations of public and private networks. In at least some embodiments, the network 114 includes a mobile wireless network, e.g., a mobile carrier network. More generally, the network 114 can include combinations of one or more of the foregoing networks, and in at least some instances includes the Internet, the World Wide Web, and the like.

The network 114 can include a service layer 116 that supports applications running at a network application layer and above, to provide data storage, manipulation, presentation, communication and/or other capabilities. The service layer 116 can be implemented using a client-server and/or peer-to-peer architecture based on application layer network protocols. Services supported by the service layer 116 can be provided by a server component running on one or more computers and accessed via a network by client components running on the same or different machines. Examples of network services include, without limitation, streaming media, Video on Demand, Voice over IP, video telephony, instant messaging, e-mail, file server, online gaming, directory services, simple network management protocol, and the like. Alternatively or in addition, the services can include virtually any service that utilizes one or more of the underlying network services. Sometimes, such services are referred to as over-the-top services.

In the illustrative example, the service layer 116 includes or otherwise supports one or more of healthcare services 118a, home automation services 118b, and security services 118c, generally referred to herein as services 118. The services 118 can be provided by the same or different service provider as the network service provider. In at least some embodiments, the services 118 include a third party service network 120. It is understood that such third party service networks 120 can provide services to the user or group directly, or in association with services 118 of the service layer 116.

In general, connected devices 106 can include, without limitation, electronic devices generally connected to other devices 106 and/or networks 114. The connected devices 106 can include, so called, smart devices, e.g., that can operate to some extent interactively and autonomously. Examples of connected devices 106 include, without limitation, home and/or office automation devices (or smart home/office devices), such as, control and automation of lighting, heating, ventilation, air conditioning (HVAC), appliances, security, entertainment, and the like. Other examples include personal monitoring devices. Examples of personal monitoring devices can include, without limitation, infant monitors and/or pet monitors, e.g., monitoring one or more of visual aspects using a camera, and/or one or more audio aspects using a microphone and/or motion sensor.

One or more of the connected devices 106 can be communicatively coupled to other devices 106 and/or networks 114 via one or more of wires, cables, fiberoptics, one or more wireless protocols, such as Bluetooth, NFC, Wi-Fi, 3G, 4G LTE, 5G, and the like. The devices 106 can be mobile, such as mobile wireless devices, fixed, as in hardwired and/or stationary, and/or any combination of mobile and fixed.

In some embodiments, monitoring devices 106 can include one or more biometric sensors. Examples of biometric sensors 106 can include, without limitation, blood pressure monitors, blood oxygen monitors, blood flow monitors, thermometers, heart rate or pulse monitors, blood glucose monitors, brain activity monitors, e.g., electroencephalography (EEG) measuring and/or recording electrical activity in the brain, heart monitors, e.g., Electrocardiography (ECG or EKG) monitoring and/or recording electrical activity in the heart, and the like. One or more of the connected devices 106 can be stationary, e.g., in a user's home 112 and/or a medical center, such as a trauma center. Alternatively or in addition, one or more of the connected devices can be mobile, e.g., wearable upon a user 104 and/or provisioned in a vehicle, such as an ambulance and/or medivac helicopter.

In at least some embodiments, the connected devices 106 can include general health monitors, such as any of the foregoing biometric sensors and/or an activity monitor 106c. The activity monitor 106c can detect movement, e.g., according to one or more of position sensing, direction or bearing, distance and/or acceleration. For example, accelerometers can be configured to monitor user activity, such as walking, jogging or running and/or general exercise. The accelerometer can operate alone or in combination with other devices, such as an altimeter and/or a location detector, such as a GPS receiver. Such configurations can track one or more of position, e.g., location, movement, speed, climb, descent, and the like.

Continuing with the illustrative example, the connected devices 106 include biometric monitors, such as a blood oximeter 166a, a pulse-rate monitor 106b and/or a fitness monitor 106c. The local ecosystem 102 includes an association of the particular connected devices 106 with the user or group 104. It is understood that in at least some embodiments, the connected devices operate autonomously or in combination to monitor biometric information of the user or group 104. Such normal operations, sometimes referred to as autopilot mode. Under normal operation, the devices are configured to monitor one or more biometric values. The monitored value(s) can be compare to a range or threshold to identify a condition, such as an abnormal condition. Comparisons of the monitored values to the ranges or thresholds can be performed by the connected devices 106, by a local ecosystem client 108, by an ecosystem server 109, or by some other application and/or process, such as an optional connected device manager 119 (shown in phantom). Identification of ranges and/or thresholds can be accomplished on a user interface of the connected devices 106, of the device manager 119, and/or via an application that facilitates management of settings of the individual connected devices 106.

In at least some embodiments, monitored values can be processed, e.g., according to statistics, and/or conversions and the like. It is understood that in at least some instances, processing can include combinations of monitored values from the same or different ones of the connected devices 106. The values and/or processed results can be stored in a data log, e.g., on the connected devices 106, the device manager 119, and/or in cooperation with a controlling application of the connected device 106 or collection of connected devices 106.

In at least some embodiments, operation of one or more of the connected devices is based on monitored values and/or resulting processed values. For example, administration of a medicine, adjustment of a temperature, a humidity, an ambient oxygen level and the like, can be controlled based on the measured and/or processed values according to a pre-programmed logic. Namely, normal operations can include sophisticated manipulation of monitored values and/or adjustment of operation of the connected devices 106 based on the preprogrammed logic. Accordingly, such normal or routine operations can proceed without intervention of the ecosystem client 102. Beneficially, the ecosystem client 102 can transition to a relatively dormant or low-power state to realize an efficiency with respect to one or more of power, processing capacity, bandwidth, memory, storage, and the like.

Upon detection of an abnormal condition, a message, signal or other suitable notification is provided to the local ecosystem client 108, the ecosystem server 109, or both. For situations in which the local ecosystem client 108 and/or server 109 are in a relatively dormant or low-power state, the notification causes the local ecosystem client 108 and/or server 109 to wake up or otherwise transition to a normal operating mode, as distinguished from the dormant mode.

In response to the notification and while in the active mode, the local ecosystem client 108 and/or server 109 determines a rule and/or policy to be applied based on the notification. In at least some embodiments, the rule and/or policy is determined according to a look-up procedure in the repository 110. Accordingly, the repository 110 can be pre-configured with one or more rules and/or policies. The rules and/or policies can be associated with the user or group 104, e.g., according to a predetermined preference and/or restriction. Such preferences and/or restrictions can be established or otherwise modified by the user or user group 104 and/or by a third party, such as a doctor, or medical clinician, or more generally, according to a related service provider.

It is understood that the rules and/or policies based on the preferences and/or restrictions can be further based on the nature of the notification. For example, different notifications can be provided according to the different connected devices 106 can be based on which device experienced a monitored value exceeding a predetermined range or threshold. Alternatively or in addition, different notifications can be provided for the same connected device, depending upon which value of multiple monitored values exceeds the range or threshold. In at least some embodiments, different notifications can be provided for the same connected device 106 and according to the same monitored value, depending upon the particular range and/or threshold exceeded.

Consider an example in which a patient's blood glucose is monitored. While the blood glucose remains in a normal range, the local ecosystem 102 and/or ecosystem server 109 can remain in a dormant or autopilot operational mode. In response to the blood glucose exceeding a first level, a patient can be notified, e.g., by text, audio and/or video message to take proactive measures to counteract the monitored change in glucose level. Such measures may include one or more of administration of a medicine, such as insulin, or consumption of a sugary drink or snack.

Continuing with this example, the blood glucose monitor provides a first notification that the blood glucose level has exceeded a normal range, but not exceeded an emergency limit. The notification is provided to the local ecosystem client 108, e.g., resident on a user's mobile phone, tablet device, set-top box, residential gateway, or the like. To the extent that the local ecosystem 108 was in a dormant mode, operation transitions to an active mode. The local ecosystem 108 observers that the notification was received from the blood glucose meter in association with a particular user 104. The local ecosystem 108 queries the repository 110 for the particular user 104 to identify a predetermined response to an moderately and not critically elevated blood glucose level.

The predetermined response can include providing a message to the user 104, as indicated above. To facilitate messaging the user 104, the local ecosystem client 108 instantiates one or more of a messaging service, an email, a VOD service, a VoIP service, and the like in the service layer 116. A message is provided to the user 104 via the one or more instantiated services. It is understood that further logic can monitor the user's blood glucose level, e.g., according to a more frequent schedule, until the blood glucose level returns to a normal range. Upon a return to the normal range, the instantiated services can be terminated, or otherwise rendered dormant. Likewise, the local ecosystem client 108 can return to a dormant or autopilot mode.

It is understood that in the illustrative example, it is possible that the user's blood glucose level may exceed a critical range or threshold. Accordingly, comparison of monitored blood glucose levels to the predetermined ranges or thresholds provides a notification. The notification can be the same as in the previous scenario. Namely, the same notification can be provided regardless as to the nature of the abnormality. In order to distinguish an appropriate response, further inspection of a monitored value, such as the value that triggered the notification can be evaluated. Alternatively or in addition, a different notification can be provided based on the nature, severity or the like of the monitored value. Accordingly, such notifications can be differentiated according to a normal situation, an abnormal but not critical situation and a critical situation, e.g., according to a green, yellow red scale.

Having determined that the blood glucose level of the user has become critical, the local ecosystem client 108 queries the repository 110 to identify a course of action. In this critical scenario, the course of action can include instantiating a service by way of the healthcare service 118*a* of the service layer 116 of the network 114. The particular service 118*a* can include access to a third party service network 120. For example, the healthcare service 118*a*, via the third party service network 120, can dispatch an ambulance 122*a* to a location, e.g., a residence or business 112 of the user 104. Alternatively or in addition, the healthcare service 118*a*, via the third party service network 120, can notify a trauma center 122c that the particular user 104 is being transported via the ambulance service 122a to the trauma center 122c. It is further understood that other services can be instantiated in coordination with one or more other services. For example, a traffic controller service 122b can coordinate traffic flow in cooperation with the dispatch of the ambulance to the user's residence/office 112 and/or transport of the user 104 to the trauma center 122c.

It should be understood that connected devices 106 can include any device, including those devices that participate in a machine architecture referred to as the Internet of Things (IoT), in which objects that form part of everyday lives can communicate through various networks. Accordingly, the connected devices can include, without limitation, appliances in a user's home, machinery in a factory setting, utility meters, vehicles, and the like.

It is further understood that one or more connected devices 106 can be associated with different ecosystems. The ecosystems can be differentiated by one or more of time, user association and/or location. For example, a home security system and/or home entertainment system can be associated with multiple members of a household. In some embodiments, a common ecosystem can be configured to which different members of the same household are affiliated as a common group of users. In a group application, a common set of preferences and/or restrictions can be associated with the group within the repository 110. Accordingly, the same actions, e.g., instantiating the same applications can result from a notification of an abnormal condition at a particular location, e.g., the home or office of the user group. Depending upon the nature of the instantiated applications, one or all of the members of the group may, by prior association with the group, experience common consequences of the instantiated applications. For example, all members of the group might receive a common message in response to the security system monitoring an abnormal situation.

In some embodiments, the same actions, e.g., instantiating the same applications in response to notification of an abnormal condition is enacted with respect to selected members of the group. Such selection of members can be based on a member's location, e.g., at the home or office 112 associated with the abnormal condition. Those members not at the home or office 112 need not be bothered by the instantiated applications. For example, any member of the group at the location 112 might receive a common message in response to a determination that a user is agitated, or bored with current entertainment selection. In response, an entertainment application can be instantiated, such as a particular VOD service and/or gaming service that provides messages and/or otherwise interacts with users at the location 112. Interaction might be by text messages, emails, video chats and the like to address the detected agitation or boredom of those at the location 112, without bothering group members who are not at the location 112.

Figure 2:
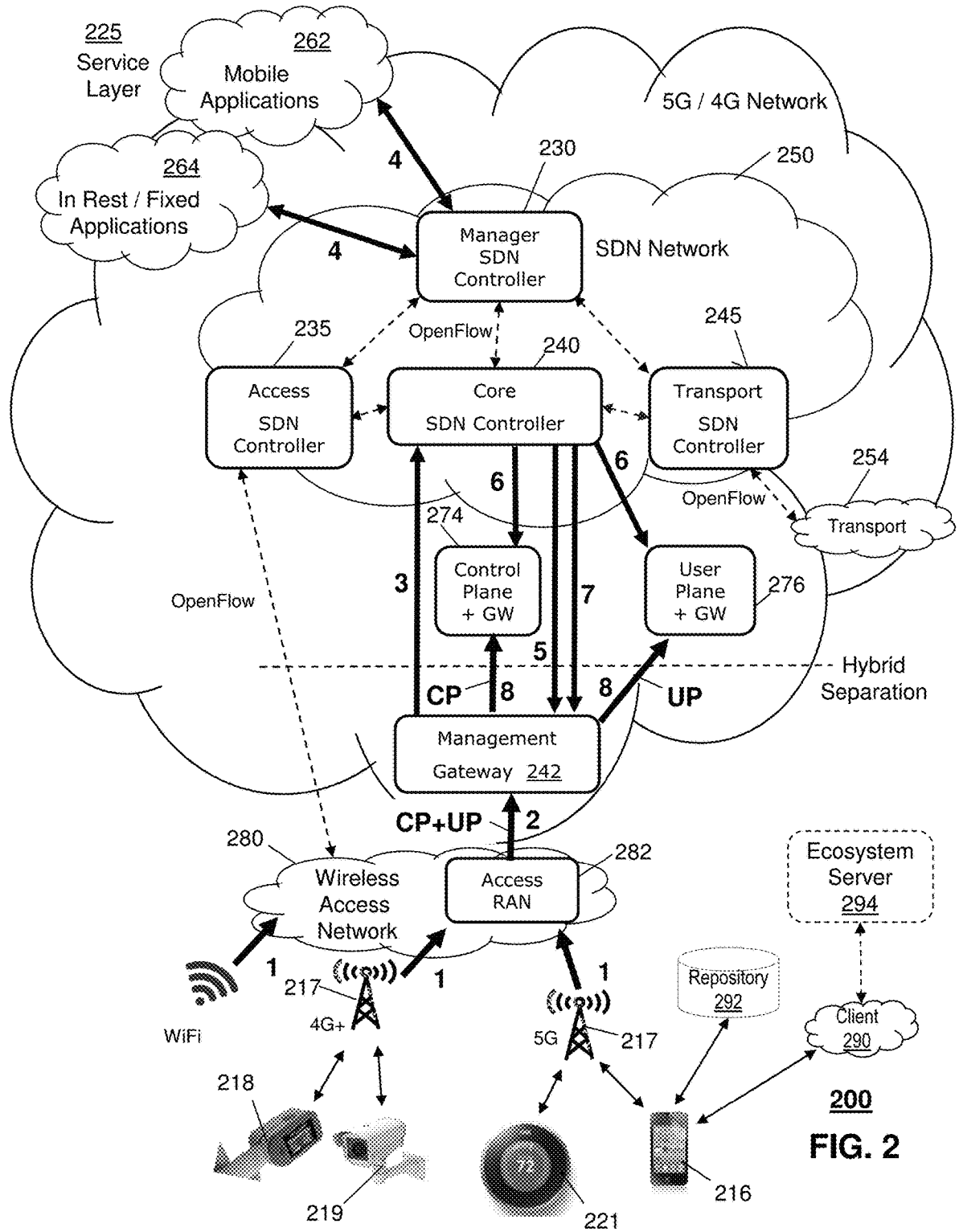
FIG. 2 depicts an illustrative embodiment of a software defined network (SDN) communication network that supports services to communication devices.

FIG. 2 depicts an illustrative embodiment of a communication system 200 that includes software defined network (SDN) elements featuring intelligent and dynamic control of network traffic that supports services to communication devices. The SDN-based communication system 200 can provide services to communication devices, and includes a controller that instantiates Management Gateways (MGWs) at the edges of the network. The MGWs can receive network traffic from various access networks, which provide local access points for the communication devices. After receiving network traffic from an access network, a MGW can send information about the network traffic to the SDN Controller. The SDN Controller can determine required service functions from this information and, in turn, can use the service function information to determine how the network traffic should be routed to one or more Core Gateways (CGWs) in the network. The SDN Controller can communicate with a selected CGW to enable Virtual Network Functions (VNF) at the CGW and can direct the receiving MGW to route the network traffic to this CGW. The SDN-based network can use the edge-located MGW to route network traffic from Fourth Generation (4G) and Fifth Generation (5G) access networks to different CGWs. The SDN-based network can also selectively separate Control Plane and User Plane processing to improve network performance. The SDN Controller can also monitor instantiated VNF elements at the MGWs and CGWs for network resources levels and modify these VNF elements, as needed, to insure optimal performance.

At least portions of the example communication network 200 can be controlled by one or more SDN Controllers. For example, a SDN network 250 can include a Manager SDN Controller 230, an Access SDN Controller 235, a Core SDN Controller 240, and/or a Transport SDN Controller 245. The functions of the different types of SDN Controllers 230-245 are further described below. Each SDN Controller, such as, for example and ease of illustration, the Manager SDN Controller 230, can be provided by a computing system executing computer-executable instructions and/or modules to provide various functions. In one or more embodiments, multiple computer systems or processors can provide the functionality illustrated and described herein with respect to each SDN Controller 230.

In one or more embodiments, the communication system 200 can include a Service Layer 225. The Service Layer 225 can provide access to services of a network service provider and/or third-party services and applications at a higher application layer. The Service Layer 225 can include capability servers, owned by the operator of the communication system 200, that can access and provide access to application layer servers owned by third-party content providers via open and secure Application Programming Interfaces (APIs). The Service Layer 225 can also provide an interface to a Core Network. The communication system 200 can also include access to Applications, such as Fixed/In Rest Applications 264 and/or Mobile Applications 262.

In one or more embodiments, the communication system 200 can include an SDN Network 250. The SDN Network 250 can include one or more SDN Controllers 230, 235, 240 and 245 that can provide different types of functions and can be arranged in virtual layers. For example, the SDN Network 250 can include a Manager SDN Controller 230 that controls and coordinates functioning of the SDN Network 250. The Manager SDN Controller 230 can be a top-level Management System in the architecture. Below the Manager SDN Controller 230, a next level of SDN Controllers 235, 240 and 245 can be instantiated and configured by the Manager SDN Controller 230 to provide specific classes of functionality in the architecture. For example, the Manager SDN Controller 230 can provide level 3 functionality to control and coordinate service control, configuration, and data flow in the communication system 200. The Manager SDN Controller 230 can, as needed, instantiate, configure, and direct level 2 SDN Controllers 235, 240 and 245 for controlling Access, Core, and Transport capabilities in the communication system 200.

In one or more embodiments, the SDN Network 250 can allow the communication system 200 to separate control plane operations from a data plane operations and can enable layer abstraction for separating service and network functions or elements from physical network functions or elements. In one or more embodiments, the Manager SDN Controller 230 can coordinated networking and provision of applications and/or services. The Manager SDN Controller 230 can manage transport functions for various layers within the communication network and access to application functions for layers above the communication network. The Manager SDN Controller 230 can provide a platform for network services, network control of service instantiation and management, as well as a programmable environment for resource and traffic management. The Manager SDN Controller 230 also can permit a combination of real time data from the service and network elements with real-time or near real-time control of a forwarding plane. In various embodiments, the Manager SDN Controller 230 can enable flow set up in real-time, network programmability, extensibility, standard interfaces, and/or multi-vendor support. In one embodiment, interactions between layers of the communication system 200 can be based upon policies to determine optimum configuration and rapid adaptation of the system 200 to changing state and changing customer requirements for example, predicted demand, addition of new users, spikes in traffic, planned and unplanned network outages, adding new services, and/or maintenance.

In at least some embodiments, the communication system 200 can be configured to receive 4G+ and 5G traffic. The Wireless Access Network 280 receives network traffic from the connected devices 216-221 that are connected to both 4G+ systems and 5G systems. To handle both 4G+ and 5G communications, the Access RAN 282 forwards network traffic to the MGW element 242 as combined Control Plane and User Plane traffic in data flow 2. However, when the Core SDN Controller 240 evaluates the network traffic associated with the communication devices 216-221, it can determine, based on the service that is requested, the that network traffic can be processed according to separate paths for the Control Plane traffic and the User Plane Traffic. The Core SDN Controller 240 can control the routing of the network traffic according to data flows 5 and 7, such that the network traffic flows separately to the Control Plane GW 274 and the User Plane GW 276 in data flows 8.

The SDN-based communication system 200 can provide features that support a user-centric ecosystem. For example, the connected devices 216-221 can include any of the various devices and/or systems disclosed herein, including those that can participate in any of the various ecosystem configurations also disclosed herein. For example, one of the connected devices, such as the mobile phone 216 can include an ecosystem client 290 that can facilitate, implement and/or otherwise orchestrate features of the user-centric ecosystem. For example, the mobile phone 216 and/or the ecosystem client 290 can access a repository 292 to determine a rule and/or policy to be applied to operation of the user-centric ecosystem. Application of the rule and/or policy can be based on or otherwise responsive to operation of one or more of the connected devices 216-221. Techniques related to dynamic network routing in a software defined network are disclosed in U.S. patent application Ser. No. 15/351,618, entitled "Method and Apparatus for Dynamic Network Routing in a Software Defined Network," filed on Nov. 15, 2016, and incorporated herein by reference in its entirety.

Figure 3:
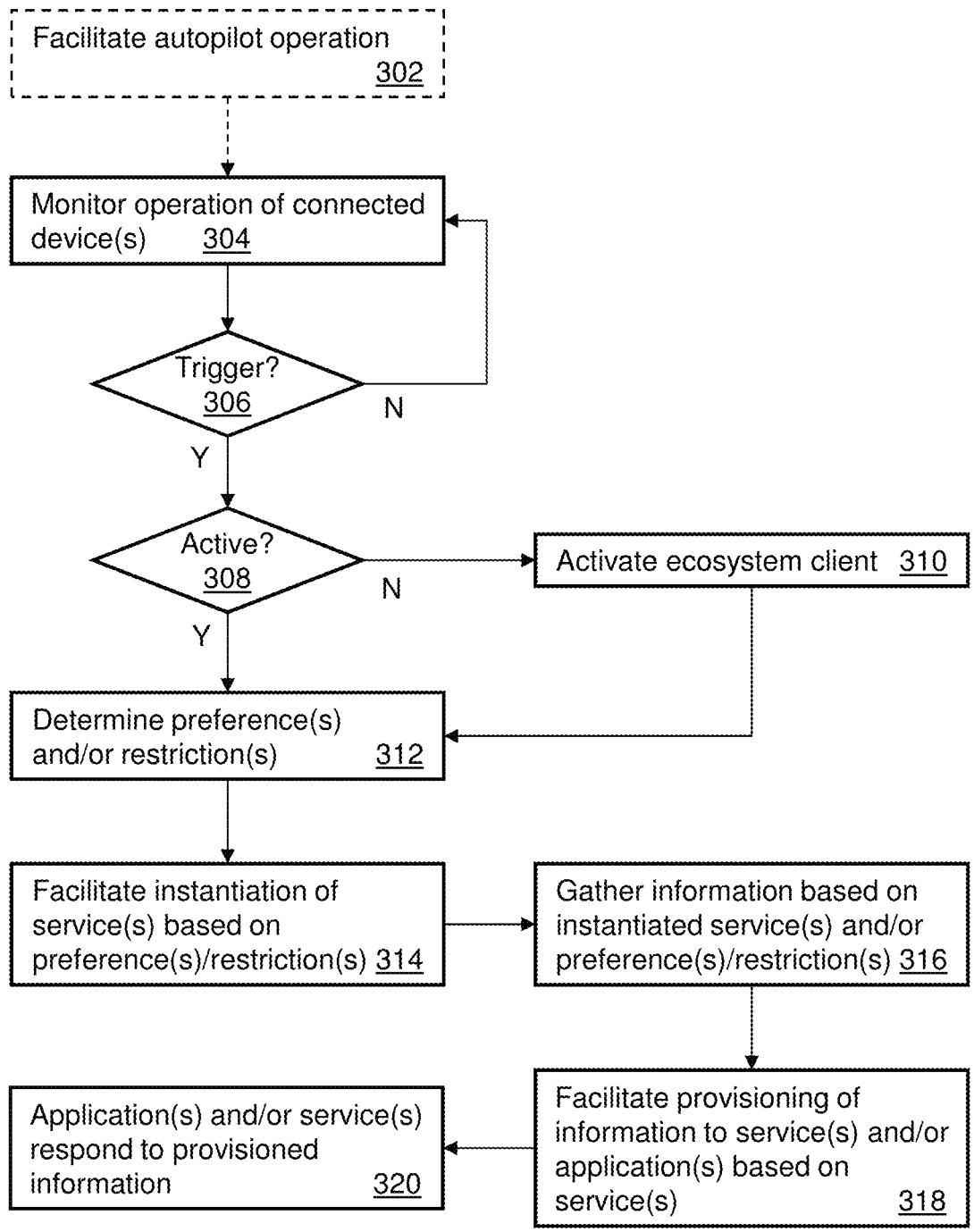
FIG. 3 depicts an illustrative embodiment of a process used in portions of the systems described in FIGS. 1-2.

FIG. 3 depicts an illustrative embodiment of a process 300 used in portions of the systems described in FIGS. 1-2. More particularly, the process 300 facilitates operation of a user-centric ecosystem that enables a real-time coordination of operation of one or more connected devices and/or services in association with a user and/or group of users. In at least some embodiments, the process 330 includes facilitating a normal operational mode, sometimes referred to as an auto-pilot mode, at 302. The normal mode operation can include operation of one or more connected devices 106 (FIG. 1). Accordingly, the devices can be identified, activated and/or otherwise instructed or caused to operate.

Normal operation of the connected devices 106 can include monitoring of the connected devices at 304. Monitoring can include observing, detecting and/or measuring a value in relation to operation of the devices 106. The value can be an environmental value, such as movement within a field of view of a camera, facial recognition, detection of audible noises, such as speech and non-speech vocalizations and/or background noise, music and the like. Alternatively or in addition the monitoring can include monitoring of biometric parameters of a user or group of users. Still other monitoring scenarios include monitoring operation of a device, such as an appliance, a machine, e.g., a vehicle.

The monitored values can be compared to a predetermined range, threshold and/or value. Such comparisons can distinguish between a normal and/or expected situation and an abnormal situation. A trigger can be identified at 306, e.g., responsive to the comparison of the monitored value with the predetermined range, threshold and/or value. In some embodiments, the trigger can identify onset of an abnormal condition, e.g., when the monitored value exceeds the range or threshold. Alternatively or in addition, the trigger can identify a return to a normal condition, e.g., when the monitored value, after having exceed the range or threshold, subsequently returns to the acceptable range or below the identified threshold.

In response to a monitored value not resulting in a trigger at 306, the process 300 returns to once again monitor one or more of the connected devices at 304. It is understood that the monitoring of more than one of the connected devices can be accomplished sequentially or in parallel. Namely, in some embodiments, each connected device can be monitored according to a monitoring schedule. For example, each device monitored, in turn, separated by a sample or monitoring delay value. When the last device has been monitored, the monitoring can return to a first device and continue in a like fashion. In some embodiments, certain connected devices may require more frequent monitoring, while others may not. In such instances, a monitoring cycle can be determined according to respective monitoring cycle times, and the monitoring conducted in a sequential and/or parallel manner according to the respective cycle times.

In response to a monitored value resulting in a trigger at 306, a subsequent determination as to whether an ecosystem client 108 (FIG. 1) is active can be accomplished at 308. To the extent that the ecosystem client 108 is inactive, the ecosystem client is activated at 310. Activation of the ecosystem client 108 can include waking the application from a dormant, relative low activity, or even inactive mode of operation. Such activation of the ecosystem client 108 can include any suitable means, such as providing an alert, a notification, a signal and/or instruction to the ecosystem client 108. Once activated, the process 300 continues to 312.

To the extent that the ecosystem client 108 is active at 308, the process also continues to 312 at which a determination is made as to one or more preferences and/or restrictions. In some embodiments, the preferences and/or restrictions can be determined automatically, e.g., according to a look-up process in conjunction with a repository 110 (FIG. 1). The lookup process can be based on one or more of an identity of a user or group of users of the user-centric ecosystem 108. Alternatively or in addition, the look-up process can be based on the monitored value(s), the nature of the activation at 310, and so on.

Having determined or otherwise identified the preference and/or restrictions, instantiation of one or more services is facilitated at 314. In at least some embodiments, instantiation of the services can be based on one or more of the preference(s) and/or the restriction(s), the user and/or group of users, the monitored value(s), and/or the trigger. For example, the ecosystem client 108, in response to a determination of a preference that an ambulance should be ordered in response to a critical abnormal condition, instantiates a healthcare service 118a in the service layer 116 (FIG. 1). In at least some embodiments, the ecosystem client 108 initiates an application that can operate alone or in combination with the instantiated service. In the illustrative example, the ecosystem client 108 can open a healthcare application on user device at the user location 112, e.g., a mobile phone of the user.

Information can be gathered based on instantiated service (s) and/or preference(s)/restriction(s), and/or applications at 316. For example, the healthcare application and/or the healthcare service 318a can operate to monitor the same or different biometric values using one or more of the connected devices. The process 300 continues to facilitate provisioning of information to service(s) and/or application (s) based on the service(s) at 318. For example, the application and/or healthcare service 318a can provide guidance and/or instruction for an emergency situation and/or provide further details, such as monitored values, a user location and the like to the healthcare service 118a. The application(s) and/or service(s) can respond to provisioned information at 320.

Figure 4:
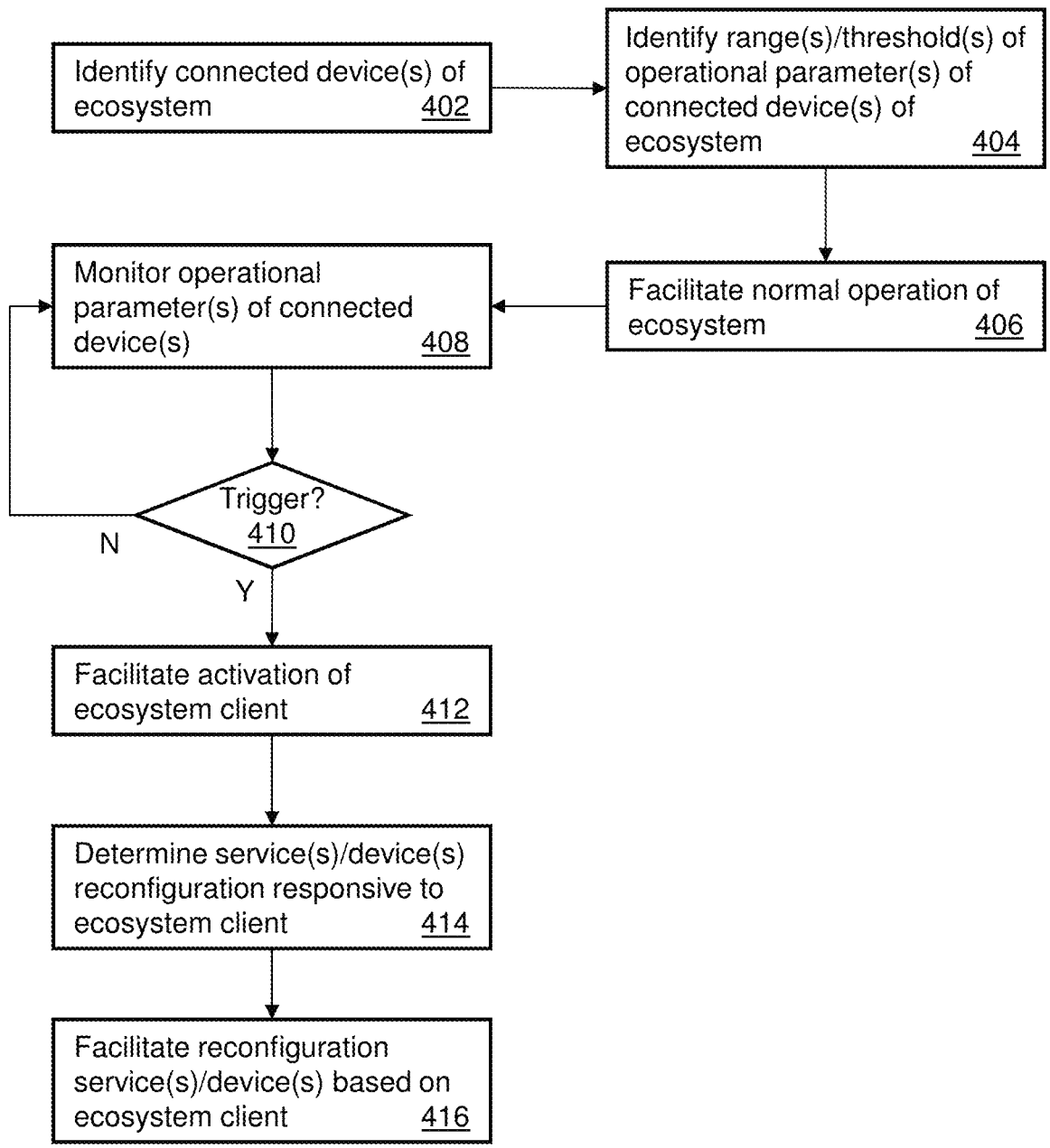
FIG. 4 depicts an illustrative embodiment of another process used in portions of the systems described in FIGS. 1-2.

FIG. 4 depicts an illustrative embodiment of another process 400 used in portions of the systems described in FIGS. 1-2. More particularly, the process 400 facilitates operation of a user-centric ecosystem that enables a real-time, adaptive coordination of operation of one or more connected devices and/or services in association with a user and/or group of users. According to the process 400, one or more connected device(s) of ecosystem are identified at 402. The user-centric ecosystem can be determined according to the identified connected devices alone or in combination with one or more services. Identification of the connected devices can be accomplished according to a user and/or group profile that identifies devices. Alternatively or in addition, the identification of the connected devices can be based on an operational state of the connected devices, e.g., devices in a powered on, active or dormant state can be identified as members of the ecosystem; whereas, devices that are powered off or otherwise disconnected or inoperative can be excluded from the ecosystem.

Range(s), threshold(s) and/or comparative value(s) of operational parameter(s) of connected device(s) of ecosystem are identified at 404. Identification of one or more of the range(s), the threshold(s) and/or the comparative values can be accomplished according to the user and/or group profile that identifies devices. Alternatively or in addition, the ranges, thresholds, and/or values can be preprogrammed into one or more of the connected devices 106 and/or a device manager 119 (FIG. 1), when provided.

Normal operation of the ecosystem is facilitated at 406. Normal operation can be predetermined, e.g., according to pre-programmed instructions, scripts, and the like. Alternatively or in addition, normal operation of the ecosystem can be facilitated by merely turning on the connected devices 106 and/or the device manager 119, when provided. Operational parameter(s) of connected device(s) are monitored at 408. The monitoring can be accomplished by the connected devices themselves, e.g., autonomously and/or according to preprogrammed instruction.

A determination is made at 410 as to whether a trigger has been detected. The trigger can result from one or more of the monitored values exceeding a predetermined range, threshold or comparative value. The trigger can include a notification and/or an alert, e.g., based on a signal provided by one or more of the connected devices 106 and/or device manager 119, when provided.

To the extent a trigger is not detected, the process continues monitoring operational parameters of connected devices at 408 and subsequently checking for triggers at 410. To the extent that a trigger is detected at 410, and to the extent that the ecosystem client is inactive, dormant, or otherwise in a relatively low-power mode, activation of the ecosystem client is facilitated at 412.

Service(s) and/or device(s) reconfiguration is determined at 414, responsive to activation of the ecosystem client. A reconfiguration of service(s) and/or device(s) is facilitated at 416, based on activation of the ecosystem client.

Figure 5:
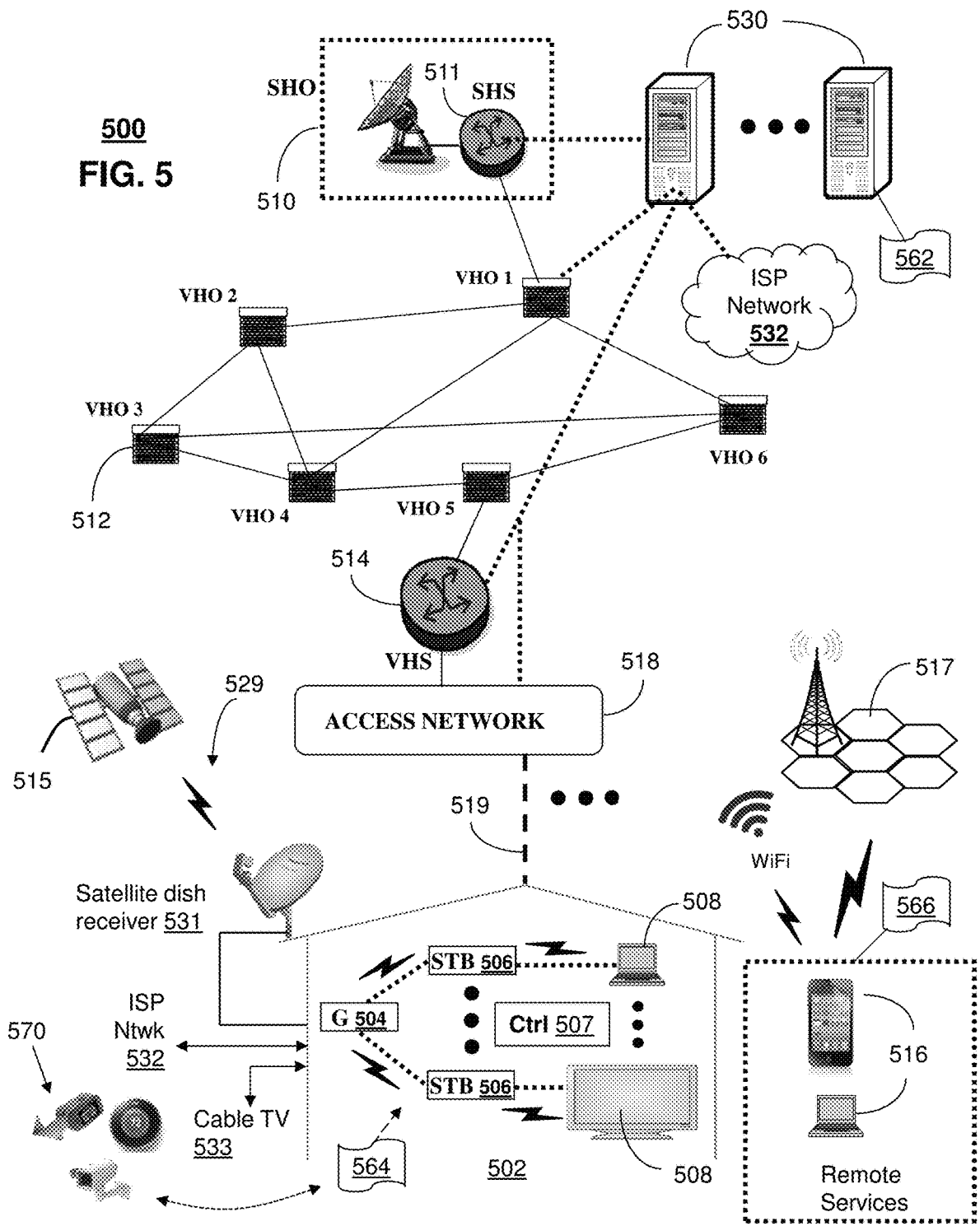
FIG. 5 depicts an illustrative embodiment of a communication system that provide media services to the ecosystems of FIGS. 1-2.

While for purposes of simplicity of explanation, the respective processes are shown and described as a series of blocks in FIGS. 4 and 5, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

F FIG. 5 depicts an illustrative embodiment of a communication system 200 that provide media services to the ecosystems of FIGS. 1-2. The communication system 500 can represent an interactive media network, such as an interactive television system (e.g., an Internet Protocol Television (IPTV) media system). Communication system 500 can be overlaid or operably coupled with the electronic services ecosystem 100 of FIG. 1, the SDN communication network 200 of FIG. 2 that supports services to communication devices as another representative embodiment of communication system 500. For instance, one or more devices illustrated in the communication system 500 of FIG. 5 detect a signal based on a monitoring of a condition by a connected device of an ecosystem of a user and/or user group. A rule is determined responsive to the detecting of the signal, wherein the rule is based on the signal and on the association between the ecosystem and the user and/or user group. In further response to the detecting of the signal, a connection is facilitated to a service layer of a service provider network and a service function is accessed via the service layer. The service function facilitates delivery of a service to the user and/or user group based on the rule.

In one or more embodiments, the communication system 500 can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol. The VHS 514 can distribute multimedia broadcast content via an access network 518 to commercial and/or residential buildings 502 housing a gateway 504 (such as a residential or commercial gateway).

The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services. System 500 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 530, a portion of which can operate as a web server for providing web portal services over the ISP network 532 to wireline media devices 508 or wireless communication devices 516.

Communication system 500 can also provide for all or a portion of the computing devices 530 to function as an ecosystem server 530. The ecosystem server 530 can use computing and communication technology to perform function 562, which can include among other things, the user-centric ecosystem configuration and/or control techniques described by the processes 300 and/or 400 of FIGS. 3 and 4. For instance, function 562 of server 530 can be similar to the functions described for the local ecosystem 102, 290 and/or the ecosystem server 109, 294 of FIGS. 1 and/or 2 in accordance with the processes 300 and/or 400 of FIGS. 3 and 4. The media processors 506 and wireless communication devices 516 can be provisioned with software functions 564 and 566, respectively, to utilize the services of a user-centric ecosystem, e.g., via the services of an ecosystem server 530. For instance, functions 564 and 566 of media processors 506 and wireless communication devices 516 can be similar to the functions described for the ecosystem client 106, 292 and/or the connected devices 110, 216, and 218-221 of FIGS. 1 and/or 2 in accordance with the processes 300, 400 of FIGS. 3 and/or 4.

Multiple forms of media services can be offered to media devices over landline technologies such as those described above. Additionally, media services can be offered to media devices by way of a wireless access base station 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

The ecosystem server 530 of FIG. 5, and/or the ecosystem client(s) 564, 566 can be operably coupled to communication system 500 for purposes similar to those described above. One or more of the ecosystem server 530 of FIG. 5 can perform the functions 562, and/or the mobile device 516, set-top box 506, gateway server 504, can provide the functions 564, 566 and thereby provide user centric ecosystem services in accordance with the processes 300, 400 of FIGS. 3 and/or 4. In at least some embodiments, one or more of the mobile device(s) 516, the set-top box 506, the gateway server 504, the smart television 508 can be adapted with software to utilize the services of the ecosystem server 530.

Figure 6:
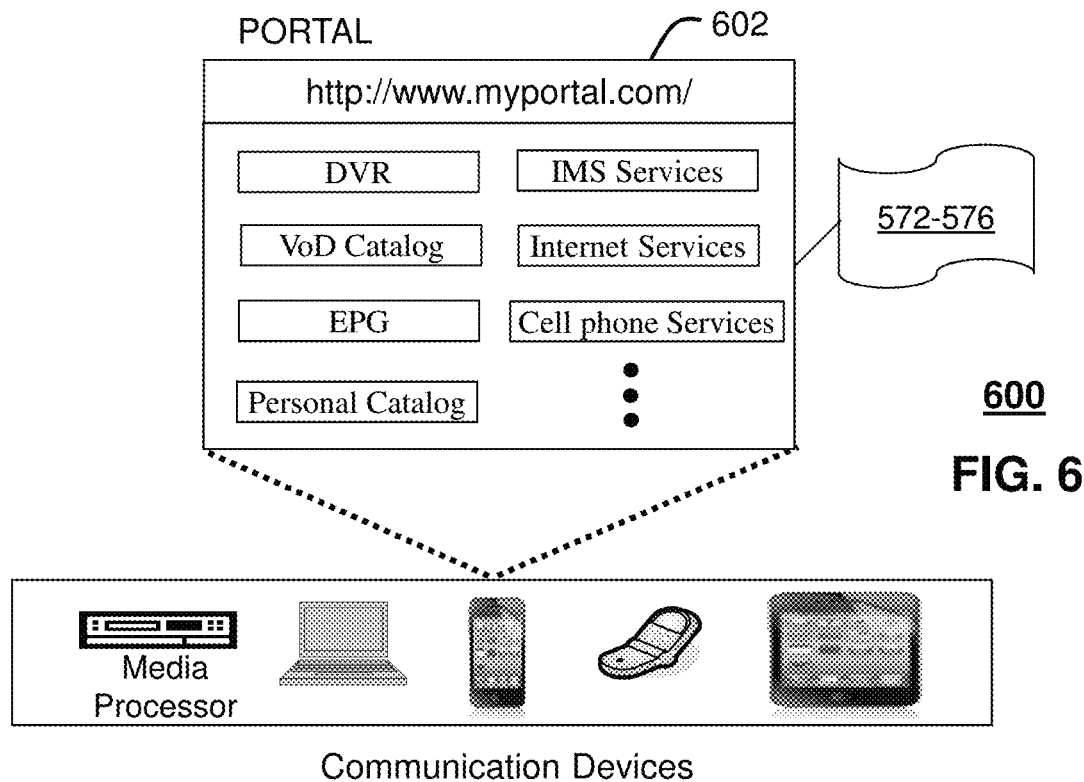
FIG. 6 depicts an illustrative embodiment of a web portal for interacting with the communication systems of ecosystems of FIGS. 1-2 and 5.

FIG. 6 depicts an illustrative embodiment of a web portal 602 of a communication system 600. Communication system 600 can be overlaid or operably coupled with systems 100, 200 of FIGS. 1 and/or 2, and/or communication system 500 as another representative embodiment of systems 100, 200 of FIGS. 1 and/or 2, and/or communication system 500. The web portal 602 can be used for managing services of systems 100, 200 of FIGS. 1 and/or 2 and/or communication system 500 of FIG. 5. A web page of the web portal 602 can be accessed by a Uniform Resource Locator (URL) with an Internet browser using an Internet-capable communication device such as those described in FIGS. 1 and/or 2 and FIG. 5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 572-576 to adapt these applications as may be desired by subscribers and/or service providers of systems 100, 200 of FIGS. 1 and/or 2 and/or system 500 of FIG. 5. For instance, users of services provided by a user-centric ecosystem provider can log into their on-line accounts and provision one or more of connected devices 110, 216, 218-221, 570 fixed and/or mobile devices 216, 516, 504-508, e.g., hosting an ecosystem client 106, 290, 564, 566 and/or an ecosystem server 530 with ecosystem management parameters. For example, the web portal 602 can be used to program and/or otherwise configure user profiles, to provide contact information to server to enable it to communication with devices described in FIGS. 1-2 and 5, and so on. Configurable parameters can include, without limitation, identification of connected devices and/or association of such devices with a user-centric ecosystem, identification of ecosystem client(s), identification of individual user(s) and/or user preferences. Other configurable parameters can include, without limitation, monitored variables, ranges, thresholds, alarm values, signal reporting rules, and the like. Alternatively or in addition, configurable parameters can include information related to services associated with the user(s) and/or the user-centric ecosystem. Services can include network service provider services and/or third party, e.g., over the top services, with adjustable parameter values including one or more of identification, for authentication authorization, auditing, security, and the like. Service providers can log onto an administrator account to provision, monitor and/or maintain the systems 100, 200 of FIGS. 1 and/or 2 and/or server 530.

Figure 7:
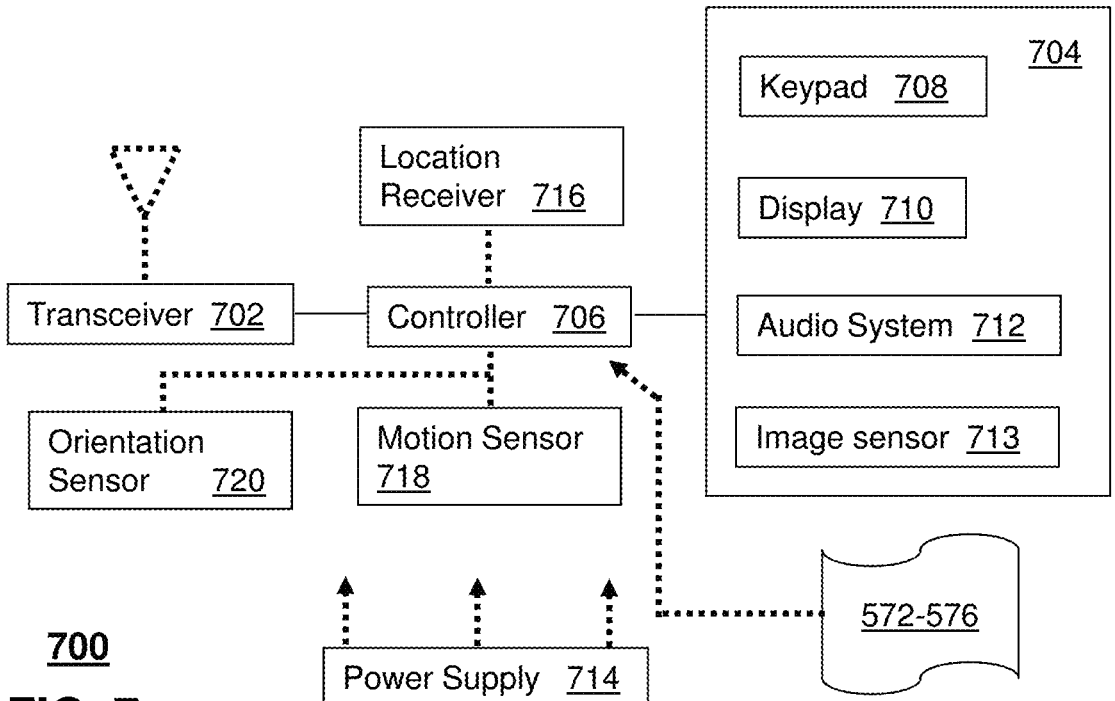
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1 and/or 2, and/or FIG. 5 and can be configured to perform portions of the processes 300, 400 of FIGS. 3 and/or 4.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of one or more of the devices of FIGS. 1 and/or 2, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in \systems 100, 200 of FIGS. 1 and/or 2, communication system 500 of FIG. 5 such as a gaming console and a media player. In addition, the controller 706 can be adapted in various embodiments to perform the functions 572-576, respectively.

Upon reviewing the aforementioned embodiments, it would be evident to an artisan with ordinary skill in the art that said embodiments can be modified, reduced, or enhanced without departing from the scope of the claims described below. For example, the monitoring of the values of more than one of the connected devices can be combined. Such combinations can be applied according to a predetermined logic. Alternatively or in addition, one or more of the monitoring of the parameters, detection of the triggers, identification of the connected devices and/or determination of the preferences and/or restrictions can be determined and/or otherwise modified according to a machine learning. Such learning can be applied according to the same ecosystem and the same user or group of users over time. Alternatively or in addition, the machine learning for one ecosystem and/or user/group can be applied according to observations of another ecosystem and/or other user or group. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
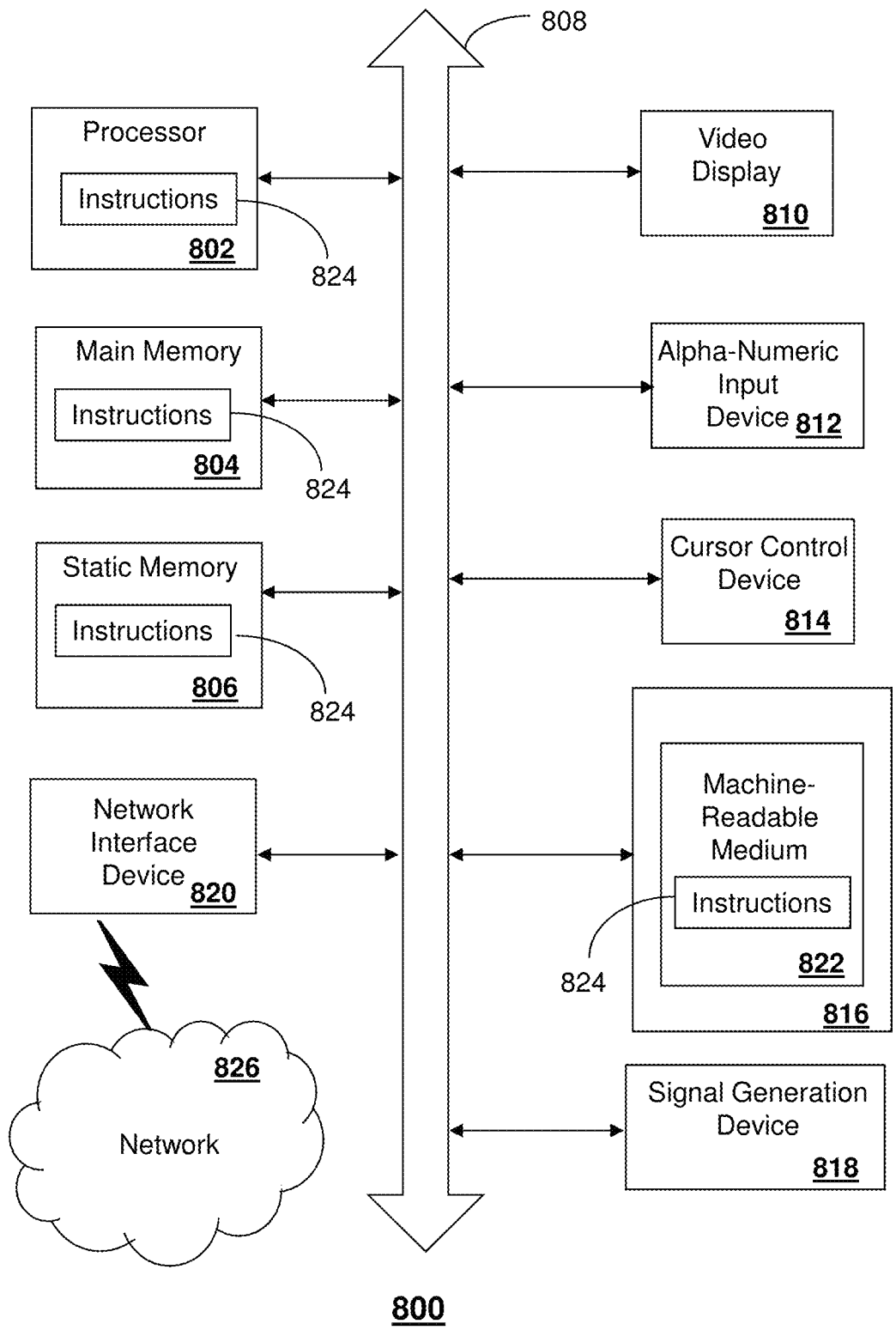
FIG. 8 is a diagrammatic representation of a machine in the form of a computer system within which a set of instructions, when executed, may cause the machine to perform any one or more of the methods described herein.

FIG. 8 depicts an example diagrammatic representation of a machine in the form of a computer system 800 within which a set of instructions, when executed, may cause the machine to perform any one or more of the methods described above. One or more instances of the machine can operate, for example, as the one or more of connected devices 110, 216, 218-221, 570, the fixed and/or mobile devices 216, 516, 504-508, e.g., hosting an ecosystem client 106, 290, 564, 566 and/or the ecosystem server 530 and other devices of FIGS. 1-2 and/or 5-7. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
   a processing system including a processor; and
   a memory that stores executable instructions that, when executed by the processing system, facilitate performance of operations, comprising:
      identifying an association between an ecosystem and a user, a group of users or both, wherein the ecosystem comprises a plurality of connected devices and a service function, wherein the plurality of connected devices and the service function are accessible via a service provider network;
      receiving an alert via a wireless mobile network based on a monitoring of an environmental condition by a connected device of the plurality of connected devices; and
      responsive to the receiving of the alert:
         identifying a predetermined rule based on the alert, wherein the predetermined rule is further based on the association between the ecosystem and the user, the group of users, or both;
         facilitating a connection to a service layer of the service provider network via the wireless mobile network; and
         accessing the service function via the service layer, wherein the service function facilitates delivery of a service based on the predetermined rule; and
         transitioning from a power-conserving mode to an active mode, wherein the identifying of the predetermined rule further comprises querying a repository comprising the predetermined rule based on the association between the ecosystem and the user, the group of users or both, and wherein the facilitating of the connection to the service layer does not occur in the power-conserving mode.

2. The device of claim 1, wherein the ecosystem operates autonomously, while in the power-conserving mode, delivering a predetermined service based on the connected device of the plurality of connected devices.

3. The device of claim 1, wherein the predetermined rule is based on a preference, a restriction or both, of the user, the group of users or both.

4. The device of claim 1, wherein the connected device is selected from a group consisting of a camera, a microphone, an accelerometer, a position sensor, a direction sensor, a motion sensor, a temperature sensor, a biometric sensor, a security system sensor, a humidistat, and any combination thereof.

5. The device of claim 1, wherein the ecosystem comprises an ecosystem client operable on a mobile device.

6. The device of claim 1, wherein the service is selected from a group consisting of streaming media, video on demand, voice over IP, video telephony, instant messaging, e-mail, file server, online gaming, directory services, and simple network management protocol.

7. The device of claim 1, wherein the receiving of the alert further comprises receiving a type of alert of a plurality of different types of alerts, the identifying of the predetermined rule further based on the type of alert of the plurality of different types of alerts.

8. A method, comprising:
   determining, by a processing system including a processor, an association between an ecosystem and a user, wherein the ecosystem comprises a plurality of connected devices and a service function, wherein the plurality of connected devices and the service function are accessible via a network;
   detecting, by the processing system, an alert based on a monitoring of an environmental condition by a connected device of the plurality of connected devices; and
   responsive to the detecting of the alert:
      identifying, by the processing system, a predetermined rule based on the alert, wherein the predetermined rule is further based on the association between the ecosystem and the user;
      facilitating, by the processing system, a connection to a service layer of the network;
      accessing, by the processing system, the service function via the service layer, wherein the service function facilitates delivery of a service based on the predetermined rule; and
      transitioning, by the processing system, from a power-conserving mode to an active mode, wherein the identifying of the predetermined rule further comprises querying a repository comprising the predetermined rule based on the association between the ecosystem and the user, and wherein the facilitating of the connection to the service layer does not occur in the power-conserving mode.

9. The method of claim 8, wherein the ecosystem operates autonomously, while in the power-conserving mode, delivering a predetermined service based on the connected device of the plurality of connected devices.

10. The method of claim 8, wherein the predetermined rule is based on a preference, a restriction or both, of the user.

11. The method of claim 8, wherein the connected device is selected from a group consisting of a camera, a microphone, an accelerometer, a position sensor, a direction sensor, a motion sensor, a temperature sensor, a biometric sensor, a security system sensor, a humidistat, and any combination thereof.

12. The method of claim 8, wherein the ecosystem comprises an ecosystem client operable on a mobile device.

13. The method of claim 8, wherein the service is selected from a group consisting of streaming media, video on demand, voice over IP, video telephony, instant messaging, e-mail, file server, online gaming, directory services, and simple network management protocol.

14. The method of claim 8, wherein the detecting of the alert further comprises detecting a type of alert of a plurality of different types of alerts, the identifying of the predetermined rule further based on the type of alert of the plurality of different types of alerts.

15. A non-transitory, machine-readable storage medium, comprising executable instructions that, when executed by a processing system including a processor, facilitate performance of operations, the operations comprising:

determining an association between an ecosystem and a user, wherein the ecosystem comprises a plurality of connected devices and a service function, wherein the plurality of connected devices and the service function are accessible via a network;

detecting a signal based on a monitoring of a condition by a connected device of the plurality of connected devices; and responsive to the detecting of the signal:
      determining a rule based on the signal, wherein the rule is further based on the association between the ecosystem and the user;
      facilitating a connection to a service layer of the network;
      accessing the service function via the service layer, wherein the service function facilitates delivery of a service based on the rule; and
      transitioning from a power-conserving mode to an active mode, wherein the determining of the rule further comprises querying a repository comprising the rule based on the association between the ecosystem and the user, and wherein the facilitating of the connection to the service layer does not occur in the power-conserving mode.

16. The non-transitory, machine-readable storage medium of claim 15, wherein the ecosystem operates autonomously, while in the power-conserving mode, delivering a service based on the connected device of the plurality of connected devices.

17. The non-transitory, machine-readable storage medium of claim 15, wherein the rules are based on a preference, a restriction or both, of the user.

18. The non-transitory, machine-readable storage medium of claim 15, wherein the connected device is selected from a group consisting of a camera, a microphone, an accelerometer, a position sensor, a direction sensor, a motion sensor, a temperature sensor, a biometric sensor, a security system sensor, a humidistat, and any combination thereof.

19. The non-transitory, machine-readable storage medium of claim 15, wherein the service is selected from a group consisting of streaming media, video on demand, voice over IP, video telephony, instant messaging, e-mail, file server, online gaming, directory services, and simple network management protocol.

20. The non-transitory, machine-readable storage medium of claim 15, wherein the signal comprises an alert signal.

* * * * *